April 26, 1938.  C. F. HAMMOND, JR., ET AL  2,115,164
ADJUSTMENT MEANS FOR STEERING GEARS
Filed June 8, 1936
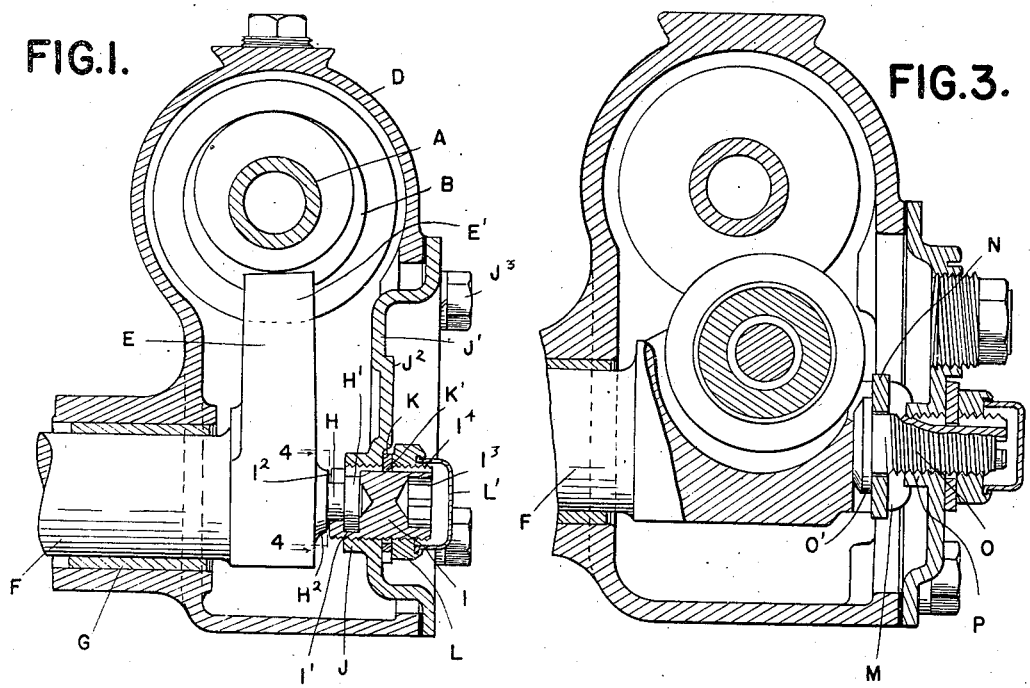
INVENTORS
CHARLES F. HAMMOND, JR.
KARL B. HOKANSSON
BY
Whittemore Hulbert Belknap
ATTORNEYS Patented Apr. 26, 1938

2,115,164

UNITED STATES PATENT OFFICE 2,115,164

ADJUSTMENT MEANS FOR STEERING GEARS

Charles F. Hammond, Jr., and Karl B. Hokansson, Detroit, Mich., assignors to Gemmer Manufacturing Company, Detroit, Mich., a corporation of Michigan Application June 8, 1936, Serial No. 84,222

5 Claims. (Cl. 74—500)

The invention relates to steering gears and is in the nature of an improvement in the construction forming the subject matter of Patent No. 2,004,374 issued June 11, 1935. It is the object of the invention to simplify the construction and to facilitate the assembly of parts as hereinafter set forth.

In the drawing:

Figure 1 is a cross-section through the worm gear housing of a steering gear showing our improved adjustment means applied thereto;

Figure 2 is an end elevation;

Figure 3 is a view similar to Figure 1 showing a modified construction;

Figure 4 is a section taken on the line 4—4 of Figure 1.

The type of steering gear common to Patent No. 2,004,374 and the present construction is one in which the steering stem A has a worm B mounted thereon, said worm being journaled in fixed bearings C within the housing D. E is the worm gear intermeshing with the worm and mounted upon a rockshaft F which is journaled in fixed bearings G within said housing. To permit of adjustment of the worm wheel with reference to the worm, the teeth E' of the former are normal to a plane which is at an angle to the plane of rotation of said wheel and so as to be inclined to the latter plane. Thus by moving the rockshaft F and gear wheel E axially, the teeth E' will be moved towards or from the worm B.

In Patent No. 2,004,374 an adjustment means was shown for moving the rockshaft and worm wheel axially comprising essentially a screw arranged in axial alignment with the shaft and having a swivel engagement therewith. This screw was engaged with a correspondingly threaded bearing in the cover of the housing for the gears so that the operator could adjust the same from outside the housing to impart the desired axial movement to the shaft. There was further provided a locking means for holding the screw in each position of adjustment. This construction was open to the objection that the swivel connection between the screw and the shaft was such that when once engaged it could not be readily removed. Consequently, it was necessary in the assembly of the parts to engage the threaded bearing on the cover plate with the screw subsequent to the attachment of the latter to the shaft. With our present construction this difficulty is avoided by providing a laterally engageable swivel connection between the screw and the shaft permitting of quick assembly or detachment, while also permitting of a slight misalignment of the axis of the screw with respect to the axis of the shaft without detriment.

As shown in Figures 1 and 2, the worm wheel E is integral with the shaft F and has projecting from the end thereof a pin H having a head H' both being concentric with the axis of the shaft. There is further a boss $H^2$ on the worm wheel E so as to form between the the same and the head H' a groove of a predetermined width. I is a screw threaded member for engaging a correspondingly threaded bearing J in a cover plate J' for the housing D. This member I has formed at its inner end a laterally extending slot I' for engaging the head H' and a slot $I^2$ of lesser width for engaging the pin H. Thus when these members are engaged the member I may be axially aligned with the shaft F and will form a swivel engagement therewith. The outer end of the member I has a polygonal recess $I^3$ therein for the engagement of a socket wrench or other means by which said member can be adjusted in the bearing J to move the shaft F and worm wheel E axially. For holding the parts in different positions of adjustment the member I has a key slot $I^4$ extending longitudinally thereof and a washer K sleeved on this member has a portion K' engaging said key slot to prevent relative rotation. This washer is held from rotation by engagement with a lug or boss $J^2$ on the cover plate J', preferably by forming a plurality of concave sides $K^2$ on said washer. A lock nut L has a threaded engagement with the portion of the member I outside of the washer K and this nut is preferably provided with a cap L' for enclosing and concealing the socketed end of the member I.

With the construction as above described, the members I, K, and L can be readily assembled with the cover plate J' when the latter is detached from the housing D. The member I may then be laterally engaged with the headed pin H and the shaft F can then be moved axially into its bearing G. The cover plate is then secured to the housing D by bolts $J^3$, this holding the members I and H in engagement with each other. To adjust the worm gear with reference to the worm so as to take up all lost motion, the member I is rotated, the lock nut L and locking washer K being first removed. After proper adjustment is made, the washer K is replaced and the nut L tightened to lock the parts in this position and thus there is no possibility of accidental displacement. To impart a slight degree of resiliency to the structure, the washer K is preferably slightly dished so that the tightening of the nut L will flatten it out to a greater or less extent.

With the modified construction shown in Figure 3, instead of forming a headed pin at the end of the shaft F, the latter is provided with flanged guides M symmetrically arranged on opposite sides of the axis of the shaft and adapted to receive a member N to hold the same from relative rotation. The member N is engaged with a threaded pin O which has a head O' bearing against said member and also against the end of the shaft F. The pin O has a threaded engagement with a corresponding bearing P on the cover plate and is held from accidental rotation by a lock washer and clamping nut similar to the construction previously described.

With both of the specific constructions above given, it is possible to first assemble the screw with the cover plate and then laterally engage the same with the shaft to form a swivel connection and one capable of transmitting end thrusts in opposite directions. Thus whenever it is necessary to adjust the gears, this may be quickly done and without the necessity of the use of shims.

What we claim as our invention is:

1. Adjustment means for the gears of a steering mechanism having a housing and a detachable cover plate therefor, said means comprising a threaded member engaging a correspondingly threaded bearing in said cover plate, and a detachable swivel coupling engagement between said member and one of said gears.

2. Adjustment means for the gears of a steering mechanism having a housing and a detachable cover plate therefor, said means comprising a threaded member engaging a correspondingly threaded bearing in said cover plate, and a laterally detachable swivel coupling engagement between said member and one of said gears.

3. Adjustment means for the gears of a steering mechanism having a housing and a detachable cover plate therefor, said means comprising a threaded member engaging a correspondingly threaded bearing in said cover plate axially aligned with one of said gears, and a laterally detachable swivel engagement between said member and said gear including a headed pin on one of said members and a flanged bearing on the other of said members having a laterally extending entrance slot.

4. Adjustment means for the gears of a steering mechanism having a housing and a detachable cover plate therefor, said means comprising a threaded member engaging a correspondingly threaded bearing in said cover plate axially aligned with one of said gears, and a laterally detachable swivel engagement between said member and said gear including a headed pin projecting from the gear and a laterally extending slot in said threaded member for receiving said headed pin.

5. Adjustment means for the gears of a steering mechanism having a housing and a detachable cover plate therefor, said means comprising a threaded member engaging a correspondingly threaded bearing in said cover plate axially aligned with one of said gears, and a laterally detachable swivel engagement between said member and said gear including a head on said threaded member and flanged guides on said gear, and a plate having a swivel engagement with said headed pin laterally engageable with said flanged guides.

CHARLES F. HAMMOND, JR.
KARL B. HOKANSSON.